United States Patent [19]
Kaneko et al.

[11] Patent Number: 5,615,025
[45] Date of Patent: Mar. 25, 1997

[54] OPTICAL MODULATION DEVICE HAVING DIFFERENT PRETILTS IN THE COMPENSATION CELL(S)

[75] Inventors: Shuzo Kaneko, Yokohama; Hideaki Mitsutake, Tokyo; Junko Shingaki, Atsugi, all of Japan

[73] Assignee: Canon Kabushiki Kaisha, Tokyo, Japan

[21] Appl. No.: 358,992

[22] Filed: Dec. 19, 1994

Related U.S. Application Data

[63] Continuation of Ser. No. 157,434, Nov. 26, 1993, abandoned, which is a continuation of Ser. No. 757,985, Sep. 12, 1991, abandoned.

[30] Foreign Application Priority Data

| | | | |
|---|---|---|---|
| Sep. 13, 1990 | [JP] | Japan | 2-241163 |
| Nov. 21, 1990 | [JP] | Japan | 2-314243 |
| Nov. 21, 1990 | [JP] | Japan | 2-314244 |

[51] Int. Cl.⁶ ............................ G02F 1/133; G02F 1/335
[52] U.S. Cl. ............................................ 349/74; 349/172
[58] Field of Search .................... 359/37, 53, 63, 359/73, 86, 100, 78

[56] References Cited

U.S. PATENT DOCUMENTS

| | | | |
|---|---|---|---|
| 4,662,721 | 5/1987 | Havada et al. | 359/78 |
| 4,869,577 | 9/1989 | Masaki | 359/78 |
| 5,126,864 | 6/1992 | Akiyama et al. | 359/53 |

FOREIGN PATENT DOCUMENTS

| | | |
|---|---|---|
| 2578994 | 9/1986 | France . |
| 2644596 | 9/1990 | France . |
| 64-040816 | 2/1989 | Japan . |
| 63-300223 | 3/1989 | Japan . |
| 2029630 | 1/1990 | Japan . |

*Primary Examiner*—William L. Sikes
*Assistant Examiner*—Charles Miller
*Attorney, Agent, or Firm*—Fitzpatrick, Cella, Harper & Scinto

[57] ABSTRACT

The present invention relates to an optical modulation device that maintains good contrast despite changes in temperature and is capable of performing stable display. A polarizer, a first and second modulator and an analyzer are provided. Each modulator is a chiral smectic liquid crystal layer held between two opposite substrates which have different orientation determining abilities. The chiral smectic liquid crystal layers have at least two stable alignment states and substantially the same temperature dependency and tilt angle. The molecular axis of the first modulator at one of the two stable alignment states is substantially parallel to a transmitting modulation axis of said polarizer and is substantially perpendicular to a transmitting polarizing axis of said analyzer, and a molecular axis at one of the two stable alignment states of said second modulator is substantially parallel to a transmitting polarization axis of said analyzer.

8 Claims, 8 Drawing Sheets

OPTICAL MODULATION DEVICE HAVING DIFFERENT PRETILTS IN THE COMPENSATION CELL(S)

This application is a continuation, of application Ser. No. 08/157,434, filed Nov. 26, 1993, now abandoned, which is, in turn, a continuation of application Ser. No. 07/757,985, filed Sep. 12, 1991, now abandoned.

BACKGROUND OF THE INVENTION

1. Field of the Invention

The present invention relates to an optical modulation element using a material having refractive anisotropy and, more particularly, to an optical modulation element using ferroelectric liquid crystals (to be referred to as FLCs hereinafter) as the material. This optical modulation element is suitably used in a display unit for displaying character and graphic images.

2. Related Background Art

In an optical modulation element using a ferroelectric liquid crystal, a scheme for producing a bistable state by using surface actions of two parallel plates having a gap (e.g., 1 to 2 μm) in which a liquid crystal layer is sealed therein is promising in a variety of applications due to its high-speed response and good memory properties.

The bistable ferroelectric liquid crystal element exhibits a bistable state in a liquid crystal molecular axis inclined by a predetermined angle from an axial direction (rubbing direction or the like) of the inner alignment surfaces (formed by rubbing or the like) sandwiching a liquid crystal layer. This angle is called a cone angle (to be referred to as $\theta_c$ hereinafter).

When a voltage is applied to the element in a direction perpendicular to the liquid crystal layer surface, the state of the ferroelectric liquid crystal transits from one stable state to the other stable state. This change corresponds to rotation of an index ellipsoid of a material having diffractive anisotropy about its major axis through an angle $2\theta_c$ within the liquid crystal layer surface. Strictly speaking, the molecular axis of the liquid crystal is not necessarily aligned with the major axis of the index ellipsoid. However, these axes are regarded to be aligned with each other for the illustrative convenience. When polarized light is incident on the ferroelectric liquid crystal element having a thickness corresponding to the action of a λ/2 plate, polarization/rotation actions for the incident polarized light by the two stable states are different from each other by $4\theta_c$. When the ferroelectric liquid crystal element is sandwiched between the polarizing elements (polarizing plates or the like) of crossed or parallel Nicol prisms, the ON/OFF ratio (transmittance ratio and contrast) of the amount of transmitted light components in the two stable states has a maximum value when $4\theta_c=90°$ ($\theta_c=22.5°$).

Figure 12:
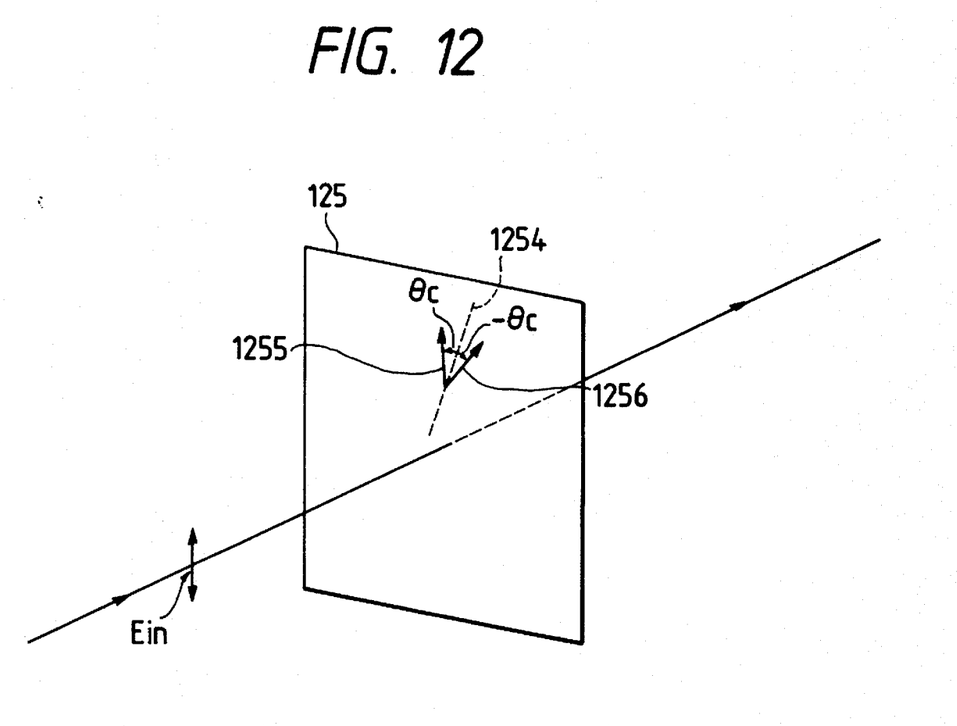
FIG. 12 is a perspective view showing an arrangement of a conventional liquid crystal element.

FIG. 12 shows a ferroelectric liquid crystal element in which polarizing elements are arranged in the form of crossed Nicol prisms. Polarized light Ein having passed through a polarizer (not shown) is incident on a liquid crystal layer 125 having an action corresponding to a λ/2 plate. In this case, a molecular axis 1255 of the liquid crystal of the liquid crystal layer 125 in one stable state is aligned with the polarization direction of the incident light. An analyzer (not shown) is arranged perpendicularly to the polarizer. A molecular axis 1256 corresponds to the other stable state. The molecular axes 1255 and 1256 of the liquid crystal respectively have cone angles of $+\theta_c$ and $-\theta_c$ from an alignment axis 1254 formed by rubbing or the like. When the liquid crystal molecules are set in the state corresponding to the axis 1255, the polarization direction of the incident polarized light is not changed and the incident polarized light is entirely shielded by the analyzer, thereby expressing black. On the other hand, when the liquid crystal molecules are set in the state corresponding to the axis 1256, the polarization direction is rotated through $4\theta_c$, and the ratio of light transmitted through the analyzer is given as:

$$\sin^2(4\theta_c)$$

thereby expressing a white state.

When the polarizing elements are arranged in the form of crossed Nicol prisms, the liquid crystal molecules in the state corresponding to the axis 1255 express the white state, and the liquid crystal molecules in the state corresponding to the axis 1256 express the black state.

The cone angle $\theta_c$ of the bistable ferroelectric liquid crystal has considerably high temperature dependency. For this reason, even if the bistable ferroelectric liquid crystal is arranged at a given temperature, as shown in FIG. 12, the polarization direction of the incident light is deviated from the direction of the molecular axis 1255 of the liquid crystal in one stable state at another temperature. For this reason, a sufficiently dark black state cannot be obtained in the form of crossed Nicol prisms, thus degrading the image contrast.

On the other hand, when the polarizer and the analyzer are arranged in the form of parallel Nicol prisms, the transmittance in the white state is decreased.

SUMMARY OF THE INVENTION

It is an object of the present invention to provide, in consideration of the conventional problems described above, a liquid crystal display element free from drawbacks such as a decrease in contrast caused by a change in temperature and capable of performing stable display.

In order to achieve the above object of the present invention, there is provided an optical modulation element having a polarizer, a modulator, and an analyzer, wherein each of the polarizer, the modulator, and the analyzer has a chiral smectic liquid crystal which has substantially the same temperature dependency and tilt angle, the polarizer and the analyzer are arranged so that molecular axes of the chiral smectic liquid crystals of the polarizer and the analyzer cross each other, and the chiral smectic liquid crystal of the modulator exhibits at least two stable alignment states, and the modulator is arranged so that a molecular axis of one of the two stable alignment states is substantially parallel to the molecular axis of one of the polarizer and the analyzer.

DETAILED DESCRIPTION OF THE PREFERRED EMBODIMENTS

According to the present invention, an action of a cone angle of a first liquid crystal on incident polarized light, which is caused by a change in temperature, is canceled by an action of a cone angle of a second liquid crystal, which is caused by a change in temperature. That is, the temperature dependency is canceled and compensated between two liquid crystals.

Figure 1:
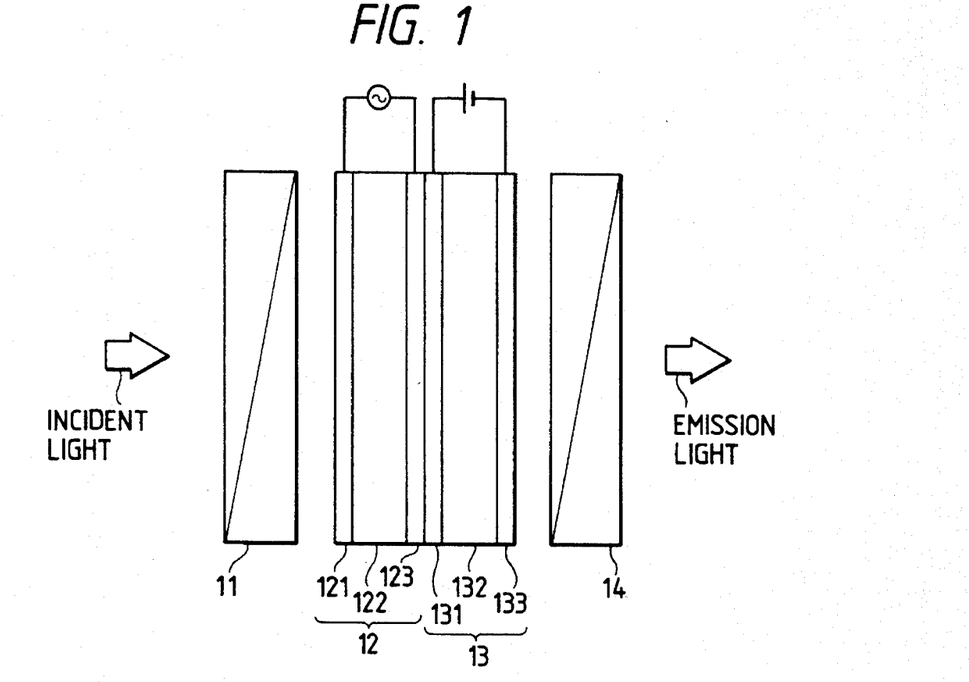
FIG. 1 is a sectional view showing an arrangement of an optical modulation element according to an embodiment of the present invention.
Figure 2:
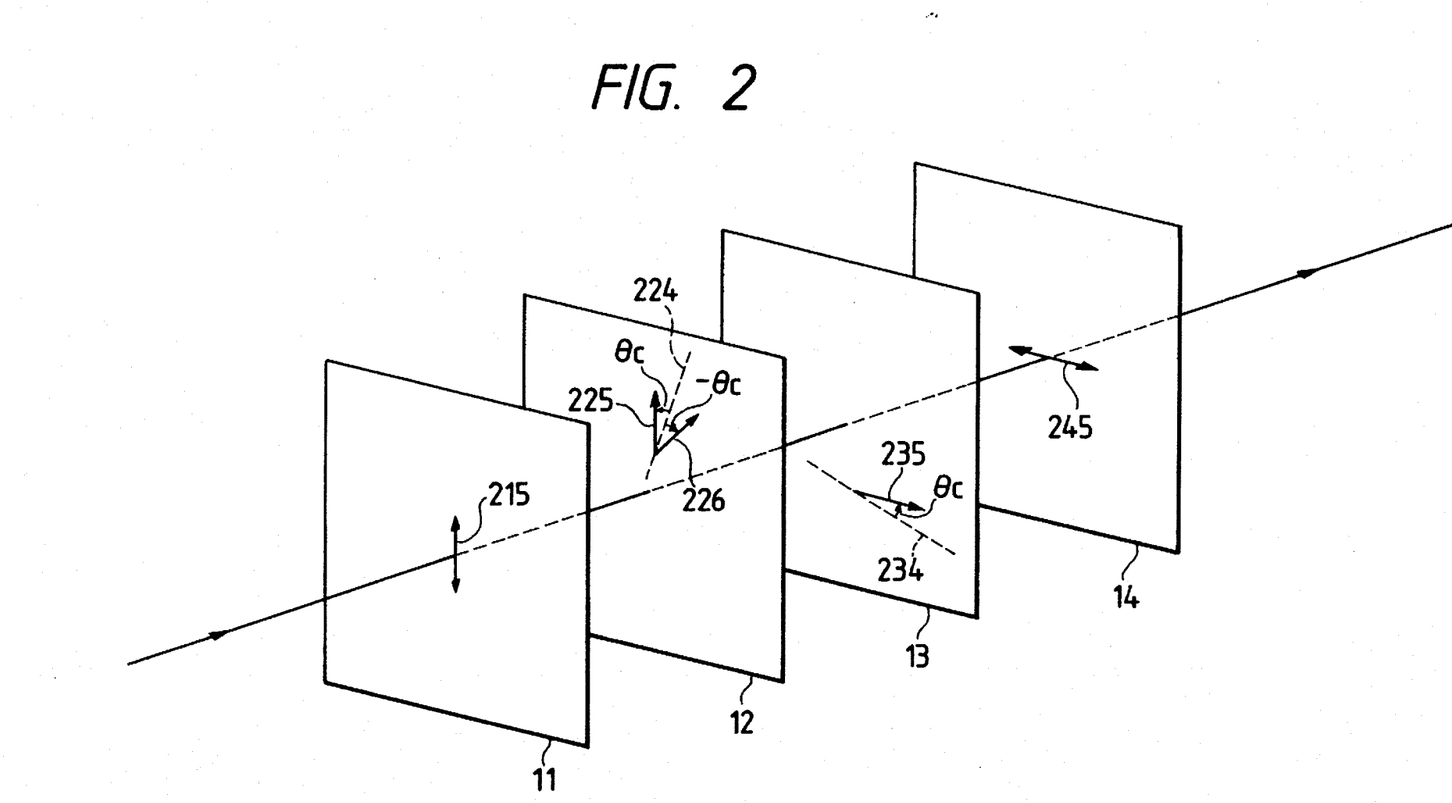
FIG. 2 is a perspective view showing an arrangement of the respective layers of the element shown in FIG. 1.

FIG. 1 is a sectional view showing an arrangement of layers constituting a chiral smectic liquid crystal element exhibiting ferroelectric properties according to an embodiment of the present invention. FIG. 2 shows states of the respective layers of the element in FIG. 1.

Referring to FIGS. 1 and 2, incident light is converted into linearly polarized light 215 by a polarizer 11. The arrangement direction of an arrangement axis 224 (e.g., uniaxial arrangement axis such as the rubbing axis) of a first liquid crystal layer 12 for performing optical modulation is selected so that a liquid crystal molecular axis 225 in one of the two stable alignment states of the first liquid crystal layer 12 is aligned with the direction of the linearly polarized light at a given temperature. At this time, a molecular axis 226 in other stable alignment state is inclined by $2\theta_c$ from the axis of the linearly polarized light. Strictly speaking, note that the liquid crystal molecular axis is defined as a high- or low-index axis of an index ellipsoid of the liquid crystal layer within a liquid crystal layer surface.

An electric field is applied to a second liquid crystal layer 13 so that an alignment axis 234 of the second liquid crystal layer 13 is perpendicular to that of the first liquid crystal layer 12 and that a direction 235 of the liquid crystal molecular axis of the second liquid crystal layer 13 is held in a stable alignment state perpendicular to the liquid crystal molecular axies 225 in one stable alignment state of the first liquid crystal layer 12. Only light components in the direction of a transmitting polarization axis 245 of an analyzer 14 are selected from all the light components passing through the first and second liquid crystal layers 12 and 13 and serve as emission light.

The first liquid crystal layer 12 comprises opposite transparent substrates 121 and 123 and an FLC molecular layer 122 sealed between the transparent substrates 121 and 123.

The second liquid crystal layer 13 is similarly constituted by transparent substrates 131 and 133 and an FLC molecular layer 132. The FLC molecular layers 122 and 132 are aligned in one direction by alignment films (not shown) formed on the inner surfaces of the substrates 121 and 123 and the substrates 131 and 133 and exhibit one of the two stable states obtained by applying an electric field to transparent electrodes (not shown) formed on the inner surfaces of the substrates.

At the given temperature serving as a reference temperature, when the liquid crystal molecular axis of the first liquid crystal layer 12 is parallel to the polarized incident light 215, the polarization state of the polarized incident light 215 is not changed. Since a liquid crystal molecular axis 236 of the second liquid crystal layer 13 is perpendicular to the polarized incident light 215, the polarized direction of the polarized incident light 215 is not changed, either. For this reason, the polarized light consists of only components perpendicular to the analyzer 14, so that emission light becomes zero (black state).

At another temperature, since a cone angle $\theta_c$ of the first liquid crystal layer 12 is changed, the liquid crystal molecular axis and the polarization direction of the polarized incident light 215 satisfy neither the parallel relationship nor the perpendicular relationship. The polarization direction of the polarized incident light 215 is changed when it passes through the first liquid crystal layer 12. However, since the cone angle $\theta_c$ of the second liquid crystal layer 13 is also changed, the molecular axis of the first liquid crystal layer 12 is kept perpendicular to that of the second liquid crystal layer 13.

The retardation actions of the first and second liquid crystal layers 12 and 13 with respect to the polarized incident light 215 have the same magnitude but opposite directions. In this embodiment arranged in the form of crossed Nicol prisms, therefore, the temperature changes for the black state automatically cancel each other. More specifically, in this embodiment, even if a change in cone angle occurs by a change in temperature, the transmittance in the black state is not changed, thereby stably obtaining image display having a high contrast level.

The present invention is not limited to the above embodiment, but various changes and modifications may be made within the spirit and scope of the invention.

For example, the order of the first liquid crystal layer 12 serving as a modulation layer and the second liquid crystal layer 13 serving as a temperature compensation layer may be reversed. This can achieve the same effect as in the above embodiment.

In the above embodiment, the polarizer and the analyzer are arranged in the form of crossed Nicol prisms. However, they can be arranged in the form of parallel Nicol prisms. In this case, a maximum transmittance can be kept to be a large value.

In the second embodiment of the present invention, ⓐ a polarizer and an analyzer are made of a bistable guest-host ferroelectric liquid crystal (to be referred to as a GH-FLC hereinafter) using a chiral smectic liquid crystal containing two-tone dyes, and temperature dependency of a cone angle (i.e., a tilt angle: ½ of the cone angle) of the GH-FLC constituting the polarizer and the analyzer is almost identical to that of the FLC for performing modulation; and ⓑ the GH-FLC constituting the polarizer and the analyzer is maintained in a stable state (of the two stable arrangement states of the liquid crystal molecules) rotated in the same direction with respect to the axial direction within the alignment surface.

In a preferred embodiment of the present invention, the alignment axis of the GH-FLC of the polarizer is perpendicular to that of the analyzer, and the alignment axis of the modulation FLC is almost parallel to the alignment axis of either one of the polarizer and the analyzer.

In a preferred embodiment of the present invention, the alignment axis of the GH-FLC of the polarizer is almost parallel to that of the analyzer, and the alignment axis of the modulation FLC is almost parallel or perpendicular to the axes of the polarizer and the analyzer.

With the above arrangement, even if a change in temperature occurs, the relative angle between the polarizer and the analyzer can be kept constant. The liquid crystal molecular axis of the modulation FLC in one stable alignment state has a predetermined angle relative to the directions of the liquid crystal molecular axes of the polarizer and the analyzer. By these two actions, a display state of the modulation FLC in one stable alignment state is not adversely affected by temperature dependency of the FLC cone angle.

When the alignment axes of the GH-FLCs of the polarizer and the analyzer are perpendicular to each other and the alignment axis of the modulation FLC is set parallel to the alignment axis of one of the polarizer and the analyzer, the polarizer and the analyzer can be arranged in the form of crossed Nicol prisms regardless of changes in temperatures. In one stable alignment state of the modulation FLC, since the one major axis of the index ellipsoid is aligned with the transmitting axis of the polarizer regardless of changes in temperatures, the polarization direction of the incident light is not rotated. By these two functions, in one stable alignment state of the modulation FLC, a black state having a low transmittance can be stably displayed regardless of changes in temperatures, thereby displaying an image having a high contrast level.

When the alignment axis of the GH-FLC of the polarizer is set parallel to that of the analyzer, and the alignment axis of the modulation FLC is set parallel or perpendicular to the alignment axes of the polarizer and analyzer, the polarizer and the analyzer can be arranged in the form of parallel Nicol prisms regardless of changes in temperatures. In one stable state of the modulation FLC, since one major axis of the index ellipsoid is aligned with the transmitting axis of the polarizer regardless of changes in temperatures, the polarization direction of the incident light is not rotated. By the above functions, in one stable state of the modulation FLC, a white state having a high transmittance can be stably displayed regardless of changes in temperatures.

Figure 3:
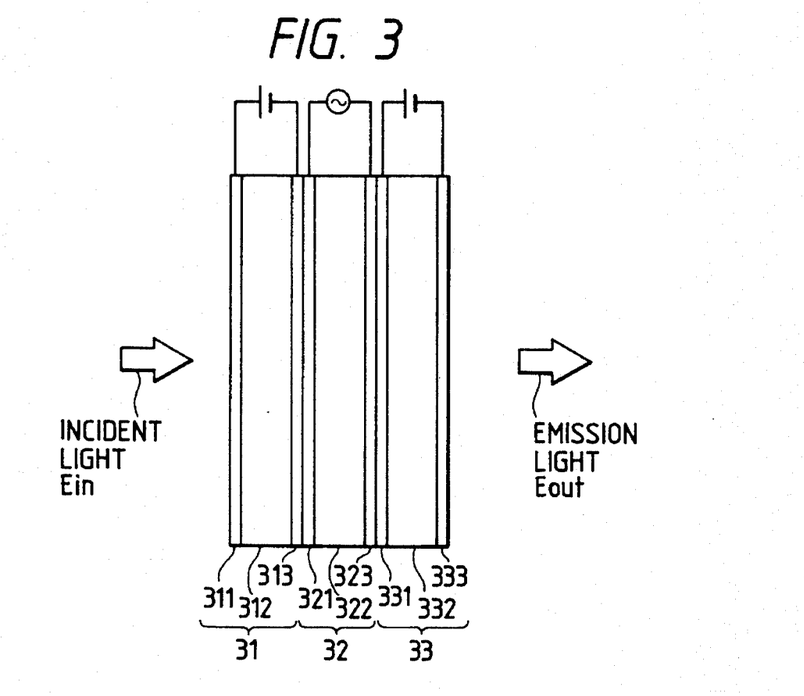
FIG. 3 is a sectional view showing an arrangement of an optical modulation element according to another embodiment of the present invention.

FIG. 3 is a sectional view showing a structure of layers constituting a ferroelectric liquid crystal element according to another embodiment of the present invention.

Referring to FIG. 3, GH bistable FLC layers 31 and 33 constitute a polarizer and an analyzer (also referred to as a polarizer 31 and an analyzer 33 hereinafter), respectively. A bistable FLC layer 32 constitutes a modulator (also referred to as a modulator 32 hereinafter). Polarized incident light passing through the polarizer 31 is phase-modulated by the bistable FLC layer 32 (modulator) which can perform modulation. Only components in the nonabsorption axis of the analyzer 33 are transmitted through the modulator 32, thereby obtaining emission light.

The modulator 32 comprises opposite transparent substrates 321 and 323 and an FLC molecular layer 322 sealed therebetween. The FLC molecular layer 322 consists of molecules arranged in a predetermined direction by alignment films (not shown) formed on the inner surfaces of the substrates 321 and 323 and are held in one of the two stable states upon application of an electric field applied to transparent conductive films (not shown) similarly formed on the inner surfaces of the substrates 321 and 323.

The GH bistable FLC layers 31 and 33 have the same layer structure as that of the FLC layer 32. The electric field constantly or appropriately applied to the GH bistable FLC layers 31 and 33 serves to uniform and stabilize the molecular axes of the polarizer 31 and the analyzer 33.

Figures 4, 5:
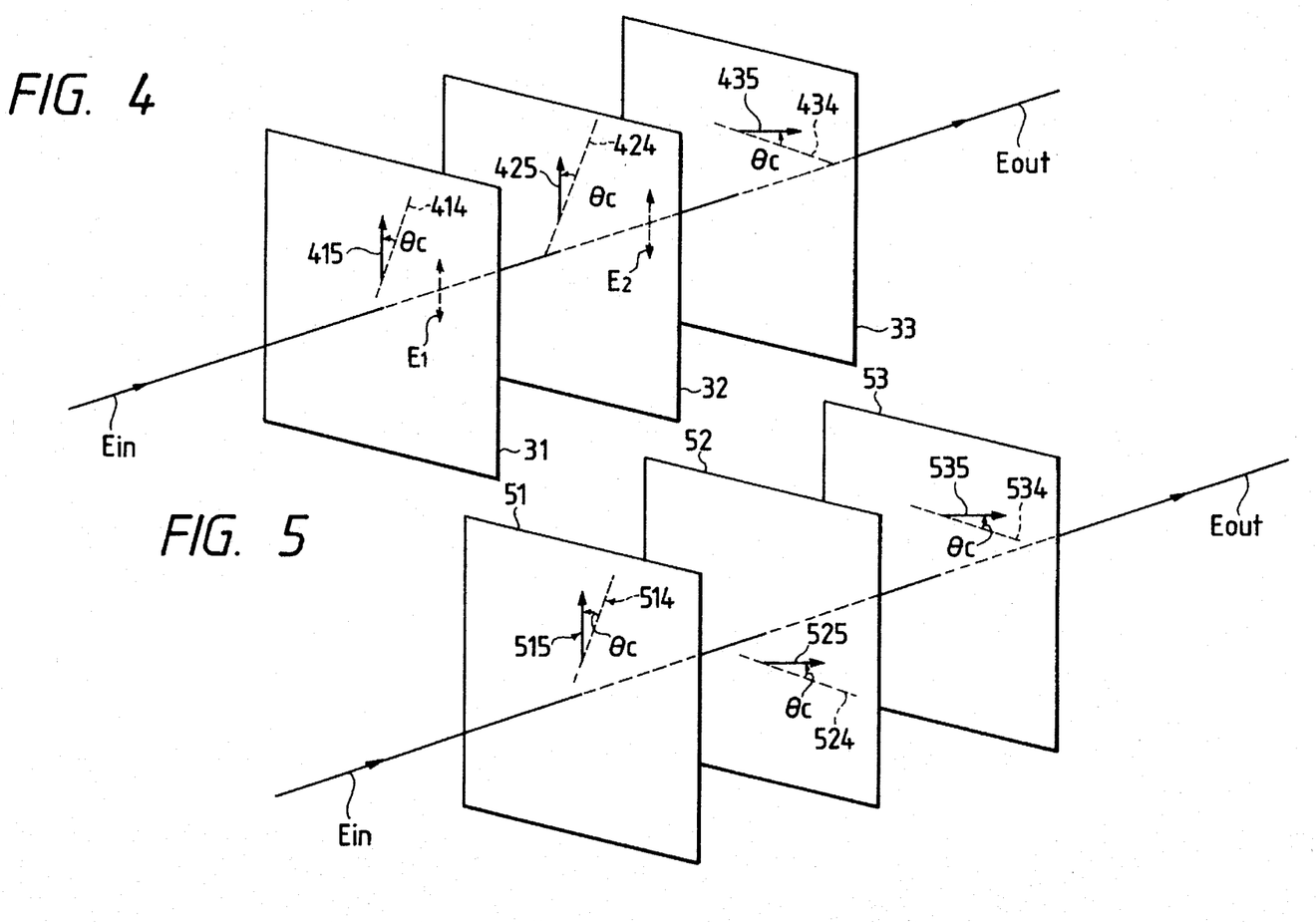
FIG. 4 is a perspective view showing an arrangement of the respective layers of the element shown in FIG. 3.
FIG. 5 is a perspective view showing another arrangement of the respective layers of the element shown in FIG. 3.

FIG. 4 shows alignment states of the respective layers and states of beams at a given temperature in the structure shown in FIG. 3. Nonpolarized incident light Ein is incident on the GH-FLC layer 31, and a polarized component in a host liquid crystal molecular axis 415, which forms a cone angle $\theta_c$ with respect to an alignment axis 414 is transmitted through this GH-FLC layer, thereby obtaining emission light $E_1$. This emission light $E_1$ serves as incident light $E_1$ on the FLC layer 32. In this case, the guest molecular absorption axis is defined as a direction perpendicular to the guest molecular axis. When the guest molecular absorption axis is parallel to the guest molecular axis, the direction of the emission light $E_1$ is defined as a direction obtained by rotating the direction of the emission light $E_1$ through 90°.

When an alignment axis 424 of the FLC layer 32 is aligned with that of the first layer 31, and the FLC layer 32 consists of liquid crystal molecules 425 having the same cone angle $\theta_c$ as that of the first layer 31. When an electric field is applied in a direction where the liquid crystal molecular axis is aligned with that of the first layer 31, the incident light $E_1$ serves as emission light $E_2$ while the polarization direction is kept unchanged.

An alignment axis 434 of the third GH-FLC layer 33 has a direction obtained by rotating that of the first layer 31 through 90°. The third GH-FLC layer 33 consists of liquid crystal molecules 435 having the same cone angle $\theta_c$ as that of the first layer 31. An electric field is constantly or appropriately applied to the first layer 31 and the third layer 33 so that their liquid crystal molecular axes 415 and 435 are perpendicular to each other. Since incident light $E_2$ on the third layer 33 is perpendicular to the transmitting axis 435 of the third layer 33, emission light $E_{out}$ becomes zero to exhibit a black state.

In the above arrangement, since the polarizer 31 and the analyzer 33 are arranged in the form of crossed Nicol prisms, and one stable arrangement state of the polarizer 32 constituted by the second FLC layer is aligned with the transmitting axis of the polarizer 31 constituted by the first FLC layer, a black state having a high contrast level can be expressed.

Alignment states with changes in temperatures will be taken into consideration. The three FLC layers 31, 32, and 33 have identical changes in cone angles with changes in temperatures. When the temperature changes, since the alignment of the molecular axis 415 of the first layer 31 is changed, the alignment of the output light $E_1$ is changed accordingly. However, since the alignment of the molecular axis 425 of the second layer 32 is also changed, the direction of the molecular axis 425 is kept aligned with the incident light $E_1$. Similarly, since the molecular axis 435 of the third layer 33 is changed as described above, it is kept perpendicular to the molecular axis 415 of the first layer 31.

In this arrangement, as described above, since a relative relationship between the polarizer 31, the modulator 32, and the analyzer 33 is kept unchanged even if the temperature changes, there is provided an element capable of displaying a high-quality image having a high contrast level in a wide temperature range.

FIG. 5 shows an arrangement of an optical modulation element according to still another embodiment of the present invention. As opposed to the structure (FIG. 4) in which the alignment axis of the second FLC layer 32 is aligned with that of the first FLC layer 31, the alignment axis of a second FLC layer 52 is aligned with that of a third FLC layer 53.

In the structure of FIG. 5, since the direction of a molecular axis 525 of the second layer 52 is perpendicular to the polarization direction of incident light $E_1$, no polarization rotation occurs. Therefore, the same effect as in the embodiment of FIG. 4 can be obtained.

The present invention is not limited to the particular embodiments described above. Various changes and modifications may be made within the spirit and scope of the invention.

As a modification of FIG. 3, the alignment axes of the first and third layers 31 and 33 may be set parallel to each other, and the alignment axis of the second layer 32 may be set perpendicular or parallel to that of the first and third layers (i.e., the form of parallel Nicol prisms). In this case, a very high maximum transmittance can be obtained.

It is also possible to arrange a reflection type ferroelectric liquid crystal element constituted by the first GH-FLC layer serving as a polarizer (also serving as an analyzer), the second FLC layer, and a reflector. In this reflection type ferroelectric liquid crystal element, the number of layers constituting the reflection type arrangement can be reduced. In addition, the form of parallel Nicol prisms can be obtained, thereby obtaining the same effect as in the parallel Nicol arrangement consisting of the above three layers.

In still another embodiment of the present invention, a liquid crystal cell constituted by two opposite substrates and consisting of liquid crystal molecules (chiral smectic liquid crystal molecules) having different pretilt angles can be obtained (hybrid arrangement state).

Figure 6:
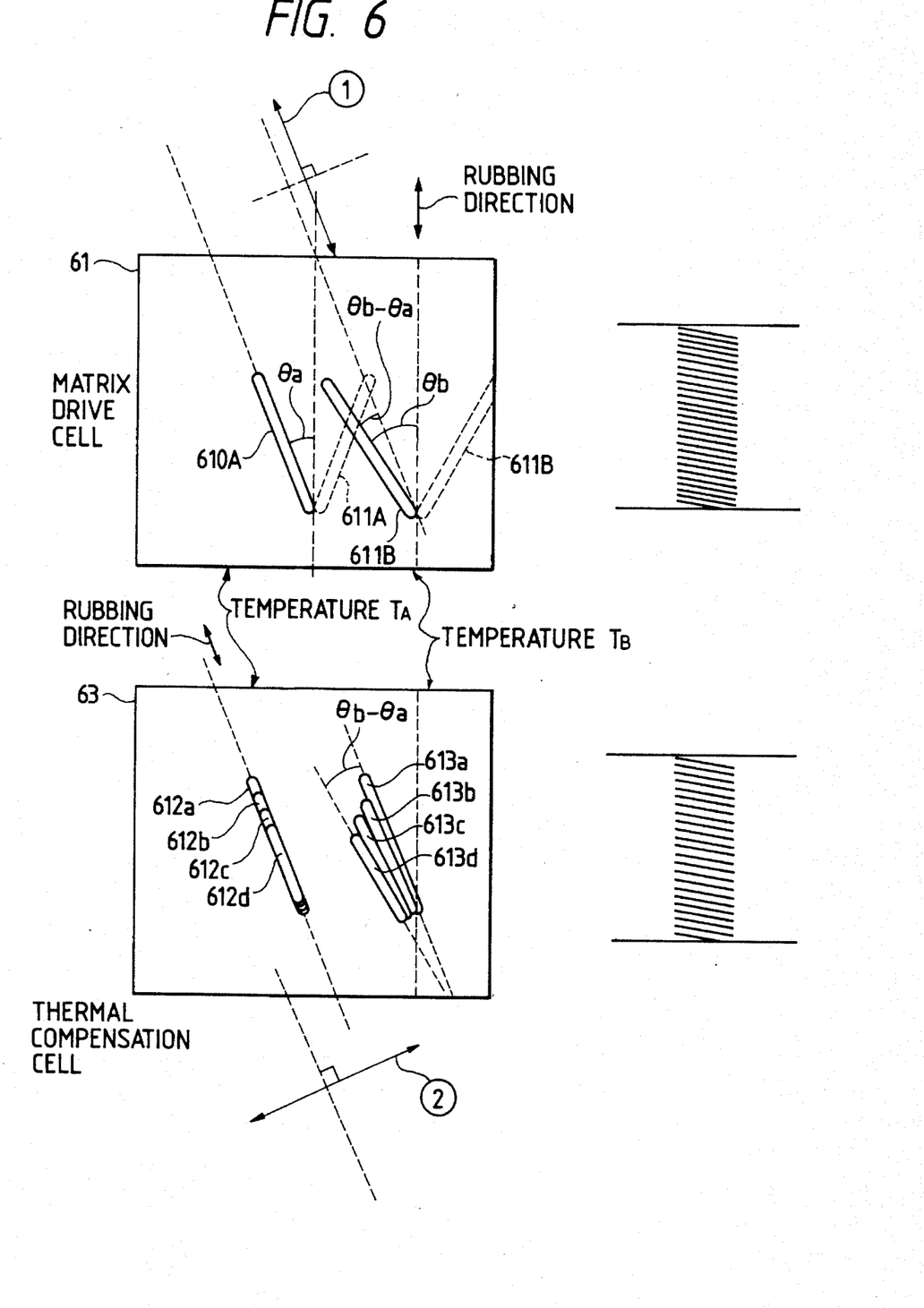
FIG. 6 is a view for explaining the principle of a liquid crystal display element according to the present invention.

FIG. 6 shows a model of a liquid crystal alignment angle obtained by a matrix drive cell 61 for selectively driving FLC pixels and a temperature compensation cell 63 stacked on the matrix drive cell 61 to compensate for a change in tilt angle caused by a change in temperature. In the structure of FIG. 6, the arrangement states of liquid crystal molecules 610A to 611B of the matrix drive cell 61 and liquid crystal molecules 612a to 613d of the temperature compensation cell 63 are represented by representative alignment states near the inner walls of the cell or of intracell liquid crystal layer bulk.

Figure 8:
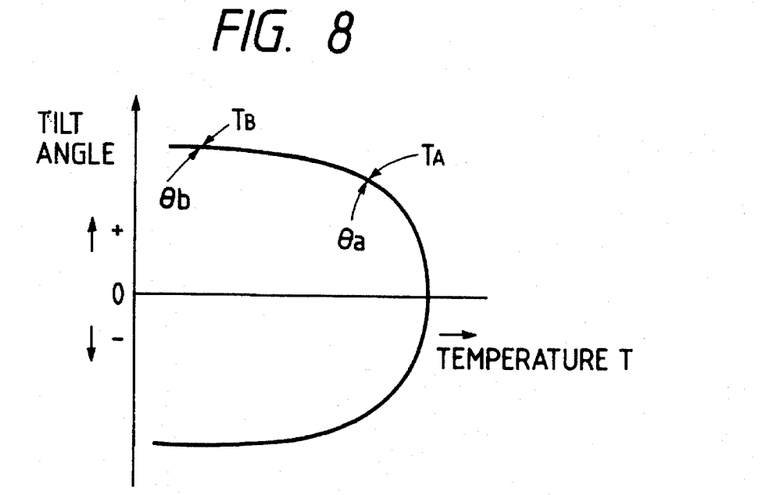
FIG. 8 is a graph showing tilt angle vs. temperature characteristics of a matrix drive cell.
Figure 9:
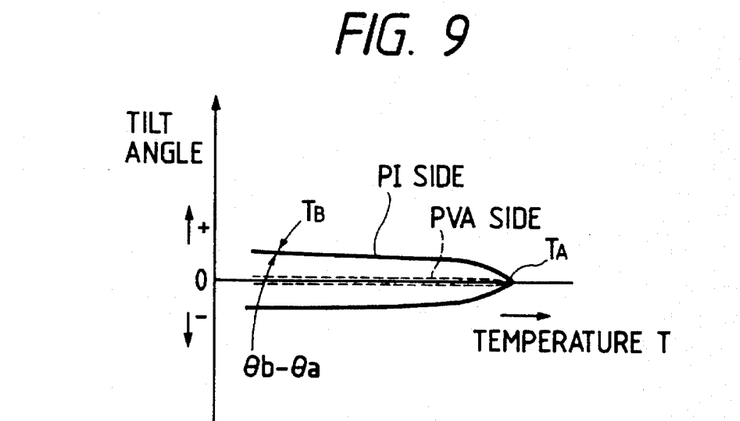
FIG. 9 is a graph showing tilt angle vs. temperature characteristics of a temperature compensation cell.

FIGS. 8 and 9 show tilt angle vs. temperature characteristics of the matrix drive cell (FIG. 8) and the temperature compensation cell (FIG. 9).

Figure 7:
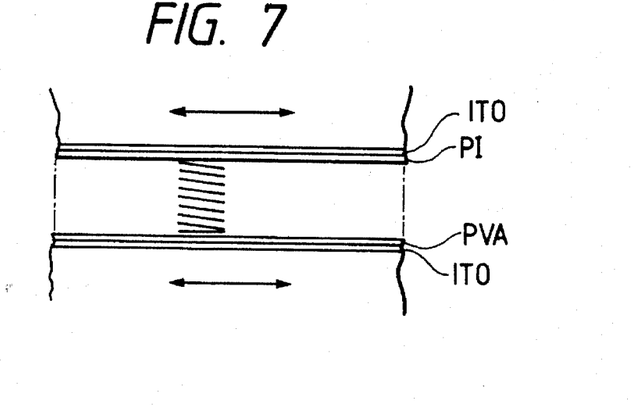
FIG. 7 is a partial sectional view showing the principle of a temperature compensation cell used in the liquid crystal display element of the present invention.

The characteristic features of the temperature compensation cell according to the present invention will be described with reference to FIG. 7. Arrangement films to be used consist of a polyvinyl alcohol (PVA) rubbed film and a fluorine-based polyimide (PI) rubbed film, thereby obtaining a hybrid alignment state. In this structure, the molecules receive a strong alignment force on the PVA film side, so that the molecules tend not to move at a relatively low pretilt angle. A pretilt angle on the PI side is higher than that on the PVA side, so that the molecules tend to be moved with a change in temperature and application of an electric field. As a result, the temperature characteristics of the tilt angle are as shown in FIG. 9. For example, a twisted structure at an angle $(\theta_b-\theta_a)$ can be obtained at a temperature $T_B$. As a result, this structure has a function of turning linearly polarized light. According to the present invention, it is effective to select the tilt angle vs. temperature change characteristics in which a change of the twist angle in the temperature compensation cell upon a temperature change is close to or equal to that of the matrix drive cell shown in FIG. 8 within a predetermined temperature range $(T_B-T_A)$.

The principle of operation of the present invention will be further described with reference to FIGS. 10 and 6.

Figure 10:
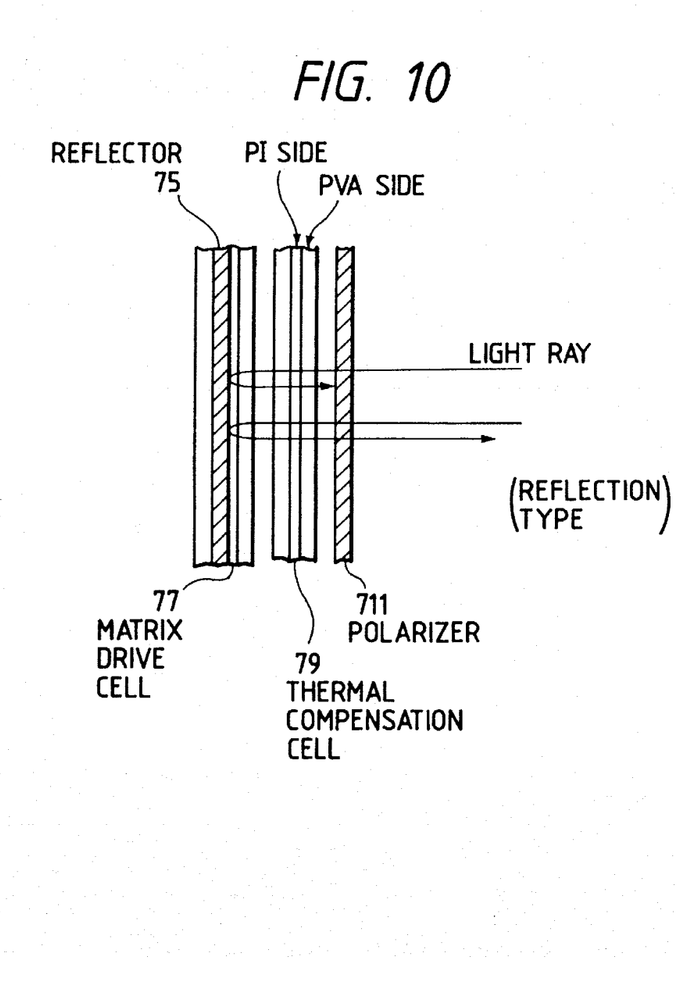
FIG. 10 is a sectional view showing an arrangement of a reflection type display element according to still another embodiment of the present invention.

FIG. 10 shows a reflection type display element in which a polarizer 711 is constituted by a reflector 75. A matrix cell 77 and a temperature compensation cell 79 are arranged such that initial molecular alignment orientations 610A and 610B of the matrix cells in FIG. 6 are adjacent to the PI side of the temperature compensation cell 79. That is, in the arrangement shown in FIG. 10, when it is to be driven in a normally white mode, molecular alignment orientations 612d and 613d in FIG. 6 are almost aligned with the initial molecular alignment orientations 610A and 610B. In this case, the molecular alignment orientations 612d and 610A can be aligned with each other, and the molecular alignment orientations 613d and 610B are almost aligned with each other in the temperature characteristics shown in FIG. 9. The transmitting axis of the polarizer 711 in FIG. 10 is set parallel to the molecular alignment orientations on the PVA side of the temperature compensation cell.

At this time, when an electric field is applied to the matrix drive cell and the molecular alignment orientations are changed to 611A and 611B at the temperatures $T_A$ and $T_B$, this portion becomes relatively black.

When the thickness of the liquid crystal layer of the matrix drive cell is set so that a retardation amount with respect to the incident light becomes a λ/4-plate length (i.e., a λ/4 length as a total of forward and backward paths), and an electric field is applied to change the molecular alignment orientations to 45°, the highest contrast level can be obtained.

The direction of the transmitting axis of the polarizer for contrast adjustment may be set to be any direction except for a direction parallel to the molecular arrangement orientation on the PVA side.

When the arrangement in FIG. 10 is to be driven in a normally black mode, the molecular arrangement orientation can be rotated through 45° with respect to the initial molecular alignment orientation of the matrix cell and the alignment orientation of the normally white mode as the molecular alignment orientation of the temperature compensation cell.

In the above description, in order to uniformly obtain the initial molecular alignment orientation (FIG. 6) on the entire surfaces of the matrix drive cell 61 and the temperature compensation cell 63, a uniform electric field is applied to the entire surface of each cell. For example, the initial molecular alignment orientation 610A or 610B is obtained for the matrix drive cell 61 by a substantially positive electric field. By a substantially negative electric field, the cell is selectively driven in the initial molecular alignment orientations 611A and 611B. A desired twisted arrangement of the temperature compensation cell can be obtained by a positive electric field.

Figure 11A:
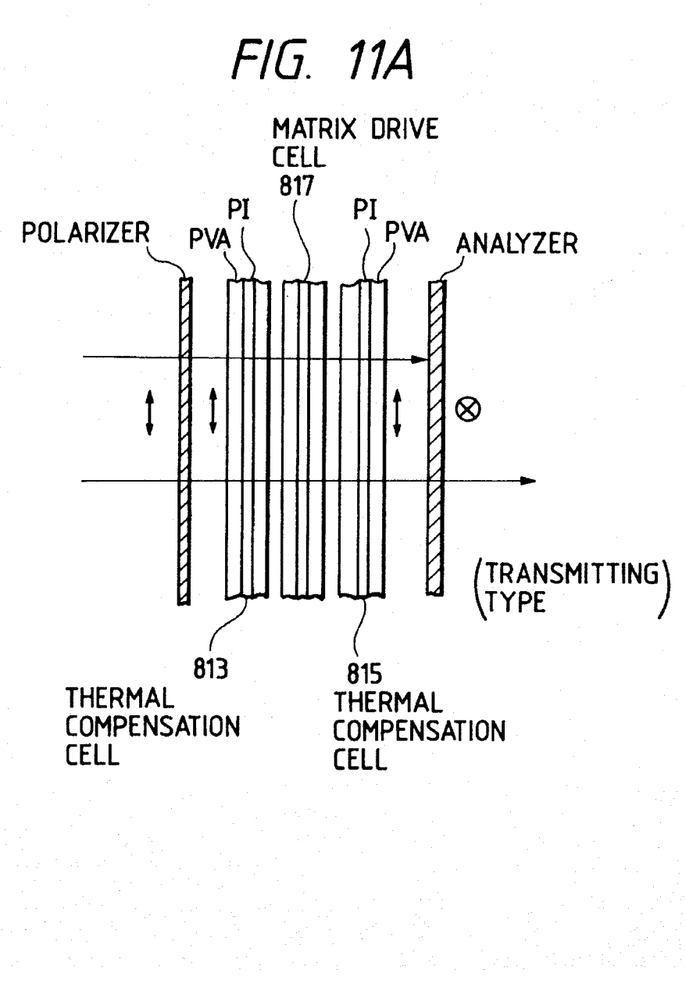
FIGS. 11A and 11B are a sectional view and a perspective view, respectively, showing an arrangement of a transmitting type display element according to still another embodiment of the present invention.
Figure 11B:
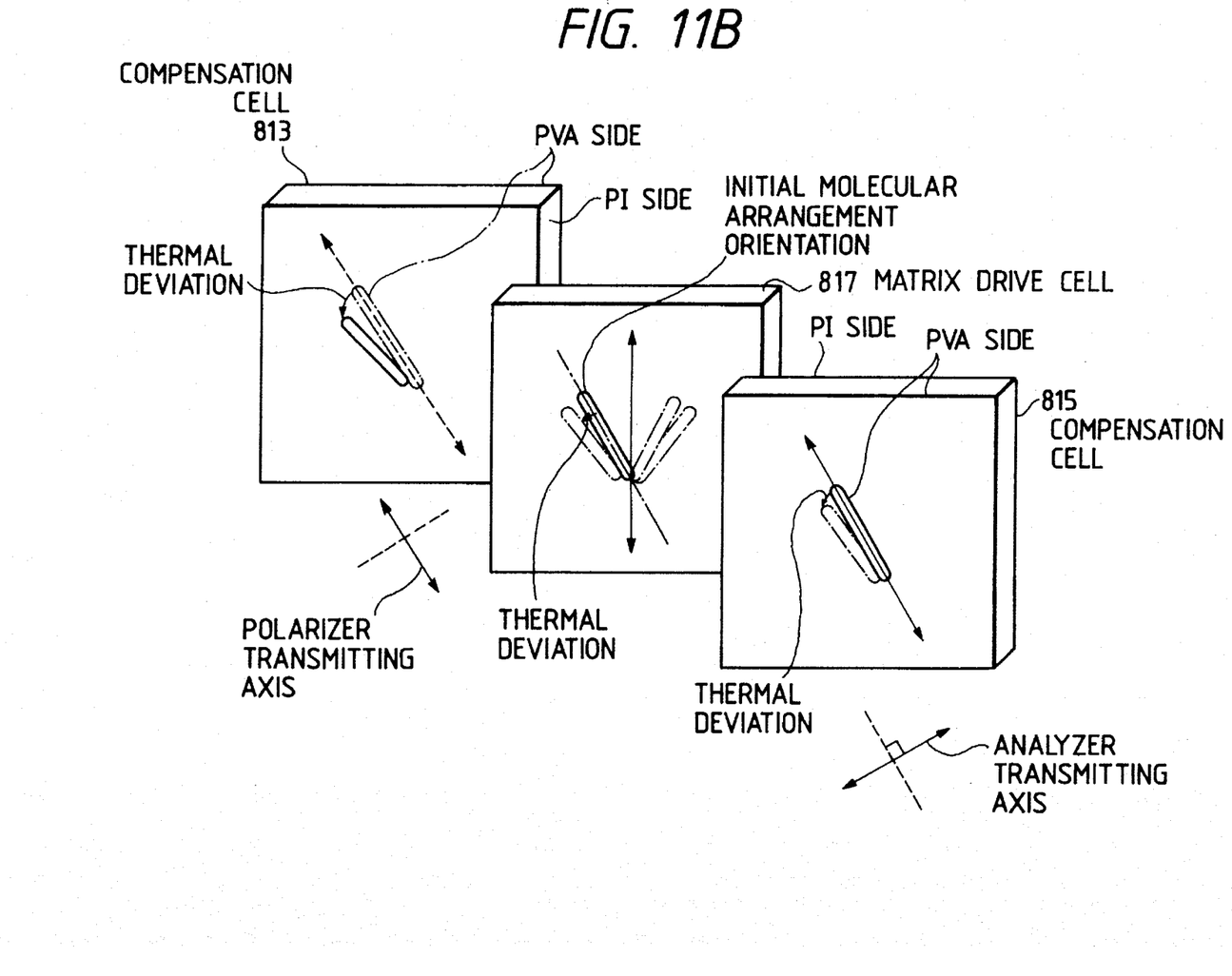

FIGS. 11A and 11B show a transmitting type display element.

In this element, a temperature compensation cell is constituted by a two-layered structure (813 and 815).

In this case, the initial molecular alignment orientation of the temperature compensation cell 813 on the PI side becomes symmetrical with that of the temperature compensation cell 815 with respect to the PVA-side molecular alignment orientation.

In order to obtain this initial molecular alignment orientation of the temperature compensation cell, positive and negative electric fields are respectively applied to the temperature compensation cells 813 and 815 first.

When the PI-side alignment orientations which sandwich a matrix drive cell 817 are set to be aligned with the initial molecular alignment orientation of the matrix drive cell 817 in its temperature characteristics, a normally black mode can be stably obtained by crossed Nicol prisms. The retardation thickness of the liquid crystal layer of the matrix drive cell 817 is optimally set to be a $\lambda/2$ length with respect to the incident light.

The temperature compensation cell preferably consists of a liquid crystal having a tilt angle sufficiently smaller than the liquid crystal tilt angle of the matrix drive cell (e.g., a cell having CS1014 available from Chisso Corp. as a liquid crystal, opposite PI arrangement films, and simple or active matrix electrodes). This liquid crystal is obtained by blending a small amount of a chiral smectic liquid crystal to a liquid crystal exhibiting SmA at room temperature. Temperature dependency of the tilt angle of this liquid crystal can be adjusted. A film treatment (a PVA film or an alignment film obtained by strong rubbing) having a capability for providing a large arrangement regulation force is used for one film for the above liquid crystal. The other alignment film is obtained by obliquely depositing the polyimide (PI) or $SiO_2$ to align the liquid crystal at a large pretilt angle, thereby obtaining a cell.

As has been described above, according to the present invention, there is provided a liquid crystal display element free from a decrease in contrast level caused by temperature characteristics and capable of performing stable display operations in a variety of applications such as a flat television, a projection television, and an OA panel.

According to the present invention, a high contrast level and a high transmittance can be constantly obtained with respect to changes in temperatures, and a high-quality image can be displayed.

What is claimed is:

1. A transmissive type optical modulation device, comprising:

a polarizer;

a first temperature compensation element comprising (i) a chiral smectic liquid crystal whose molecule axis changes the direction depending on temperature, and (ii) a pair of substrates having electrodes so as to apply the electric field, thus aligning said molecule axis uniformly in one direction;

a switching element comprising (i) a chiral smectic liquid crystal having at least two molecular alignment states, and (ii) a pair of substrates having electrodes so as to apply an electric field, thus controlling the directions of the molecule axes of said chiral smectic liquid crystal;

a second temperature compensation element comprising (i) a chiral smectic liquid crystal whose molecule axis changes direction depending on the temperature, and (ii) a pair of substrates having electrodes so as to apply an electric field, thus aligning said molecule axis uniformly in one direction; and an analyzer, wherein liquid crystal molecules of said first and second temperature compensation elements have the same pretilt angle $\Theta_1$ at the surface of one substrate facing said switching element, and have a different pretilt angle $\Theta_2$ at the surface of another substrate, and said polarizer and said analyzer are arranged so that molecule axes of the chiral smectic liquid crystal of said polarizer and said analyzer cross each other.

2. A transmissive type optical modulation device according to claim 1, wherein said first and second temperature compensation elements and switching element are provided with a molecular orientation treatment at the interface between substrate and liquid crystal.

3. A transmissive type optical modulation device according to claim 1, wherein said molecular orientation treatment is a uniaxial orientation treatment.

4. A transmissive type optical modulation device according to claim 1, wherein said molecular orientation treatment is provided by rubbing method.

5. A reflex type optical modulation device, comprising:

a light polarizing means;

a temperature compensation element comprising (i) a chiral smectic liquid crystal whose molecule axis direction changes depending on the temperature, and (ii) a pair of substrates having electrodes so as to apply an electric field, thus aligning said molecule axis uniformly in one direction;

a switching element comprising (i) a chiral smectic liquid crystal having at least two molecular alignment states; and (ii) a pair of substrates having electrodes so as to apply an electric field, thus controlling the directions of the molecule axes of said chiral smectic liquid crystal; and a reflector, wherein liquid crystal molecules of said switching element have the same pretilt angle $\Theta_1$ at both surfaces of said pair of substrates, and liquid crystal molecules of said temperature compensation element have the pretilt angle $\Theta_1$ at the surface of the substrate facing said switching element, and have a pretilt angle $\Theta_2$ at the surface of another substrate facing the polarizing means, wherein $\Theta_1$ and $\Theta_2$ satisfy the relationship $\Theta_1 > \Theta_2$.

6. A reflex type optical modulation device according to claim 5, wherein said temperature compensation element and switching element are provided with a molecular orientation treatment at the interface between substrate and liquid crystal.

7. A reflex type optical modulation device according to claim 5, wherein said molecular orientation treatment is a uniaxial orientation treatment.

8. A reflex type optical modulation device according to claim 5, wherein said molecular orientation treatment is provided by rubbing method.

* * * * *

UNITED STATES PATENT AND TRADEMARK OFFICE
CERTIFICATE OF CORRECTION

PATENT NO. : 5,615,025
DATED : March 25, 1997
INVENTOR(S) : Shuzo Kaneko et al.

It is certified that error appears in the above-indentified patent and that said Letters Patent is hereby corrected as shown below:

ON THE TITLE PAGE:

Item [56], REFERENCES CITED, U.S. PAT. DOCUMENTS

"Havada et al." should read --Harada et al.--.

REFERENCES CITED, FOREIGN PAT. DOCUMENTS

"63-300223 3/1989 Japan" should read --63-300223 3/1988 Japan--;
and
"2029630 1/1990 Japan" should read --2-29630 1/1990 Japan--.

Signed and Sealed this

Second Day of September, 1997

Attest:

BRUCE LEHMAN

Attesting Officer

Commissioner of Patents and Trademarks